(12) United States Patent
Douglas

(10) Patent No.: US 8,800,112 B1
(45) Date of Patent: Aug. 12, 2014

(54) GRIPPING SYSTEM FOR A HANDLE

(71) Applicant: Richard Douglas, Tucson, AZ (US)

(72) Inventor: Richard Douglas, Tucson, AZ (US)

(*) Notice: Subject to any disclaimer, the term of this patent is extended or adjusted under 35 U.S.C. 154(b) by 0 days.

(21) Appl. No.: 13/715,731

(22) Filed: Dec. 14, 2012

Related U.S. Application Data

(60) Provisional application No. 61/576,685, filed on Dec. 16, 2011.

(51) Int. Cl.
*A47J 45/00* (2006.01)
*B25G 3/32* (2006.01)

(52) U.S. Cl.
USPC ............................. 16/422; 16/431; 16/421

(58) Field of Classification Search
CPC .... A63B 49/08; A63B 53/14; A63B 59/0014; B62K 21/12; B62K 21/26; A01K 87/08; A46B 5/021; B25G 1/00; B25G 1/10; B25G 1/102; B25G 1/105; B25G 1/125
USPC ........... 16/421, 422, 428, 430, 431, 435, 413, 16/DIG. 12; 294/171, 15, 102.1, 102.2, 294/137, 132; 74/551.9; 15/144.1, 144.2, 15/144.3, 143.1, 145
See application file for complete search history.

(56) References Cited

U.S. PATENT DOCUMENTS

| | | | | | |
|---|---|---|---|---|---|
| 3,072,955 | A | * | 1/1963 | Mitchell | 294/171 |
| 5,056,945 | A | * | 10/1991 | Klodt | 401/6 |
| 5,083,825 | A | * | 1/1992 | Bystrom et al. | 294/171 |
| 5,348,360 | A | * | 9/1994 | Mencarelli et al. | 294/57 |
| 5,511,445 | A | * | 4/1996 | Hildebrandt | 74/558.5 |
| 6,006,403 | A | * | 12/1999 | Battiato | 16/421 |
| 6,148,482 | A | * | 11/2000 | Maraman, Jr. | 16/421 |
| 6,234,924 | B1 | * | 5/2001 | Washburn, Jr. | 473/568 |
| 6,235,134 | B1 | * | 5/2001 | Mueller | 156/83 |
| 6,974,626 | B2 | * | 12/2005 | Horacek | 428/354 |
| 7,669,291 | B1 | * | 3/2010 | Blum | 16/435 |
| 7,861,380 | B2 | * | 1/2011 | Moore et al. | 16/421 |
| 2004/0050205 | A1 | * | 3/2004 | Putnam | 74/558 |
| 2011/0232038 | A1 | * | 9/2011 | Miller | 16/421 |

* cited by examiner

*Primary Examiner* — Chuck Mah

(57) ABSTRACT

A gripping system for a handle has a cylindrical handle with a handle exterior surface. The system has a flexible gripping wrap with a plurality of outwardly protruding ridges and a plurality of inwardly protruding channels located on a wrap bottom surface. The gripping wrap has a first recessed ledge located on an intersection of a wrap top surface and a wrap second edge and a second recessed ledge located at an intersection of the wrap bottom surface and a wrap fourth edge. The gripping wrap is located on, and flexibly covers at least a portion of the handle exterior surface. The second recessed ledge is adapted to overlay, interface with, and attach to the first recessed ledge.

16 Claims, 7 Drawing Sheets

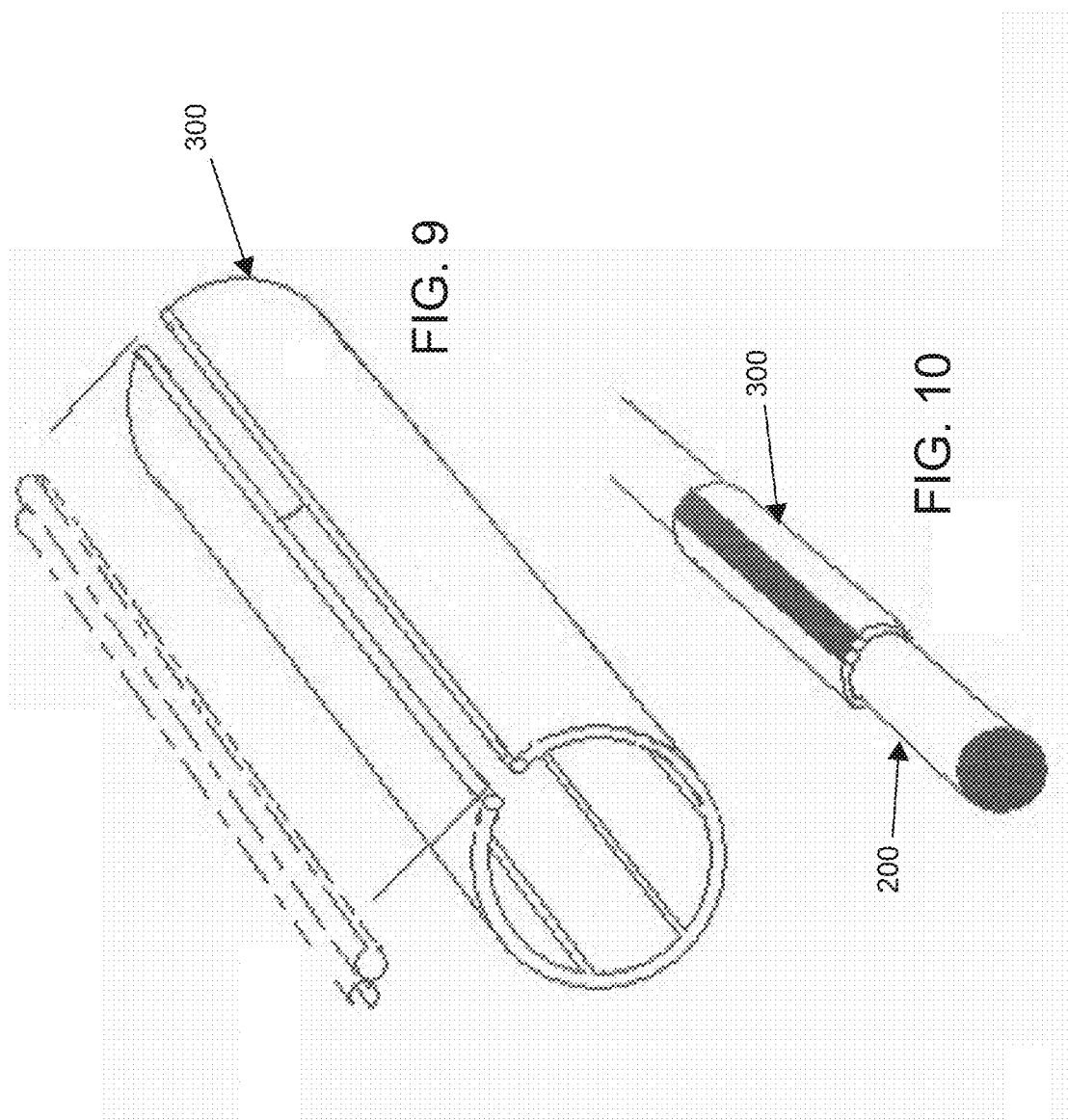

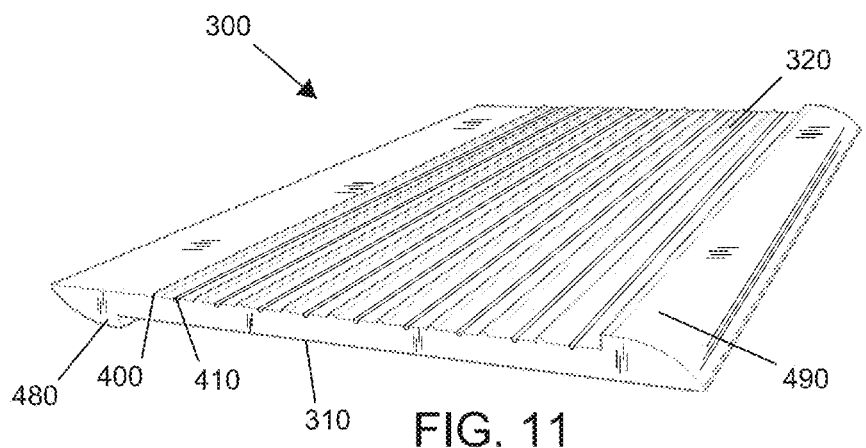
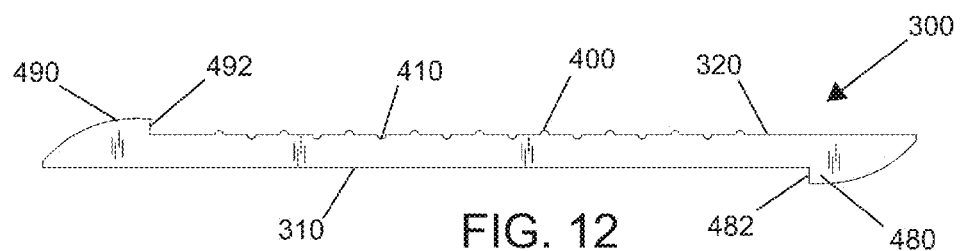
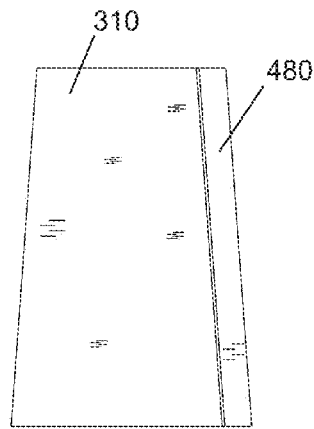
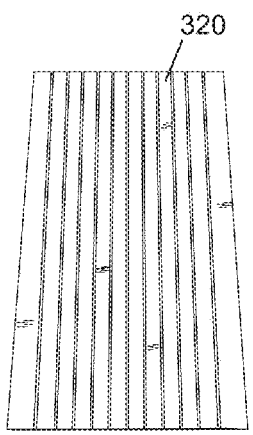
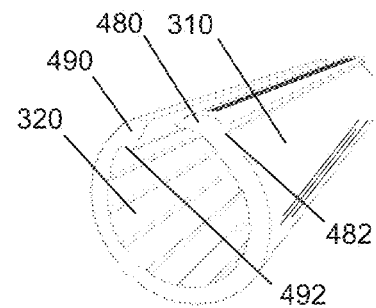

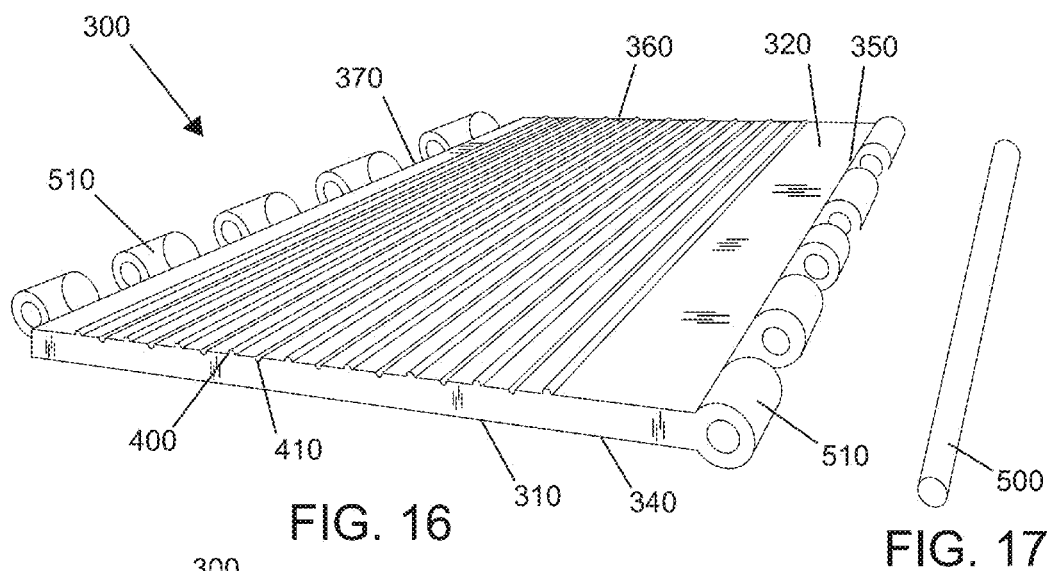
FIG. 16
FIG. 17
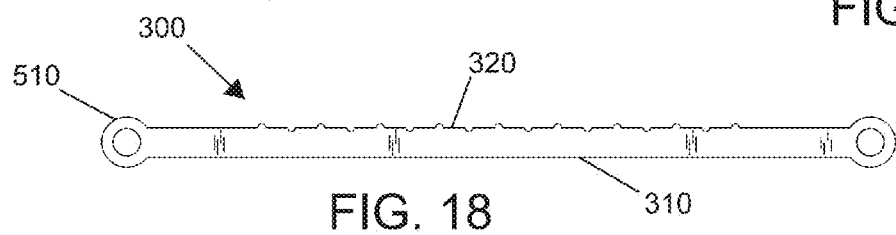
FIG. 18
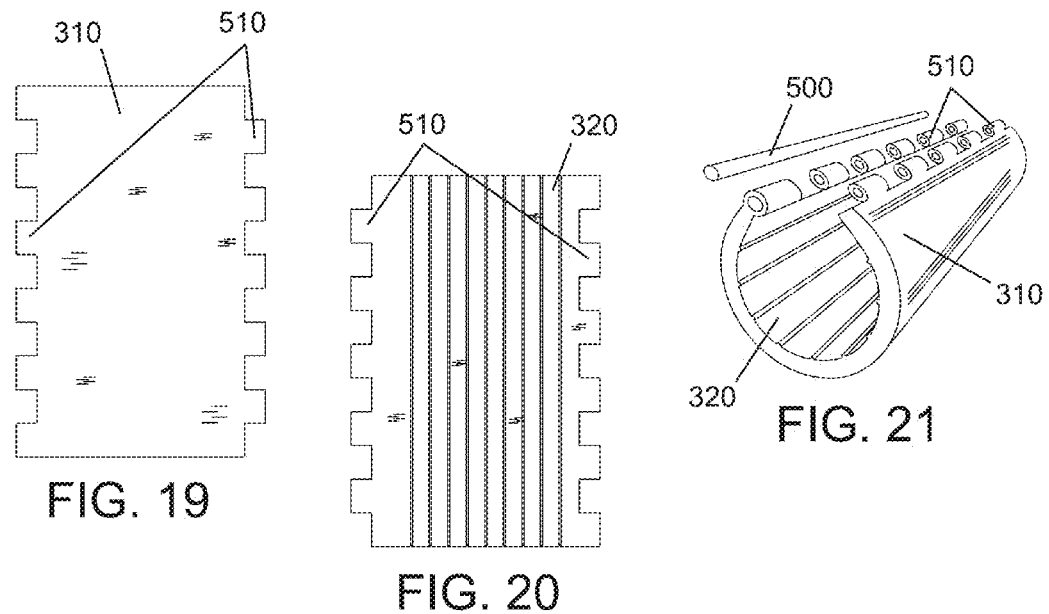
FIG. 19
FIG. 20
FIG. 21

GRIPPING SYSTEM FOR A HANDLE

CROSS REFERENCE

This application claims priority to U.S. provisional application Ser. No. 61/576,685 filed Dec. 16, 2011, the specification of which is incorporated herein by reference in its entirety.

BACKGROUND OF THE INVENTION

Various embodiments of grips have been used on handles to aid to a user in holding, carrying, pushing, pulling, guiding or steering an object. Sometimes, grips wear out over time and are not replaced due to the difficulty of obtaining the correct replacement for the application. Sometimes makeshift grips are used, but if the grip is not specified or installed correctly, the makeshift grip can lead to discomfort, operational problems, or safety hazards when used. The present invention provides a solution for a new or replacement gripping system for a handle.

SUMMARY

The present invention features a gripping system for a handle. In some embodiments, the system comprises a cylindrical handle having a handle exterior surface.

In some embodiments, the system comprises a flexible gripping wrap. In some embodiments, the gripping wrap comprises a plurality of outwardly protruding ridges located on a wrap bottom surface. In some embodiments, the gripping wrap comprises a plurality of inwardly protruding channels located on the wrap bottom surface. In some embodiments, the gripping wrap comprises a first recessed ledge located on an intersection of a wrap top surface and a wrap second edge. In some embodiments, the gripping wrap comprises a second recessed ledge located at an intersection of the wrap bottom surface and a wrap fourth edge.

In some embodiments, the gripping wrap is located on and flexibly covers at least a portion of the handle exterior surface. In some embodiments, the second recessed ledge is adapted to overlay, interface with, and attach to the first recessed ledge. In some embodiments, the gripping system for the handle is adapted to provide gripping stability and comfort for a user.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 9 is a perspective view of an alternate embodiment of the gripping wrap of the present invention.

FIG. 10 is a perspective view of an alternate embodiment of the gripping wrap of the present invention.

FIG. 11 is a perspective view of an alternate embodiment of the gripping wrap of the present invention.

FIG. 12 is a side view of an alternate embodiment of the gripping wrap of the present invention.

FIG. 13 is a top view of an alternate embodiment of the gripping wrap of the present invention.

FIG. 14 is a bottom view of an alternate embodiment of the gripping wrap of the present invention.

FIG. 15 is a perspective view of an alternate embodiment of the gripping wrap of the present invention.

FIG. 16 is a perspective view of an alternate embodiment of the gripping wrap of the present invention.

FIG. 17 is a perspective view of an alternate embodiment of the locking rod of the present invention.

FIG. 18 is a side view of an alternate embodiment of the gripping wrap of the present invention.

FIG. 19 is a top view of an alternate embodiment of the gripping wrap of the present invention.

FIG. 20 is a bottom view of an alternate embodiment of the gripping wrap of the present invention.

FIG. 21 is a perspective view of an alternate embodiment of the gripping wrap of the present invention.

DESCRIPTION OF PREFERRED EMBODIMENTS

Following is a list of elements corresponding to a particular element referred to herein:

| | |
|---|---|
| 100 | Gripping system |
| 200 | Handle |
| 210 | Handle exterior surface |
| 300 | Gripping wrap |
| 310 | Wrap top surface |
| 320 | Wrap bottom surface |
| 330 | Wrap thickness |
| 340 | Wrap first edge |
| 350 | Wrap second edge |
| 360 | Wrap third edge |
| 370 | Wrap fourth edge |
| 400 | Ridge |
| 410 | Channel |
| 420 | First recessed ledge |
| 430 | Second recessed ledge |
| 440 | Gripping aid |
| 450 | Textured surface |
| 460 | Adhesive component |
| 470 | Magnetic component |
| 480 | First projection |
| 482 | First projection ledge |
| 490 | Second projection |
| 492 | Second projection ledge |
| 500 | Locking rod |
| 510 | Cylindrical pocket |

Figure 1:
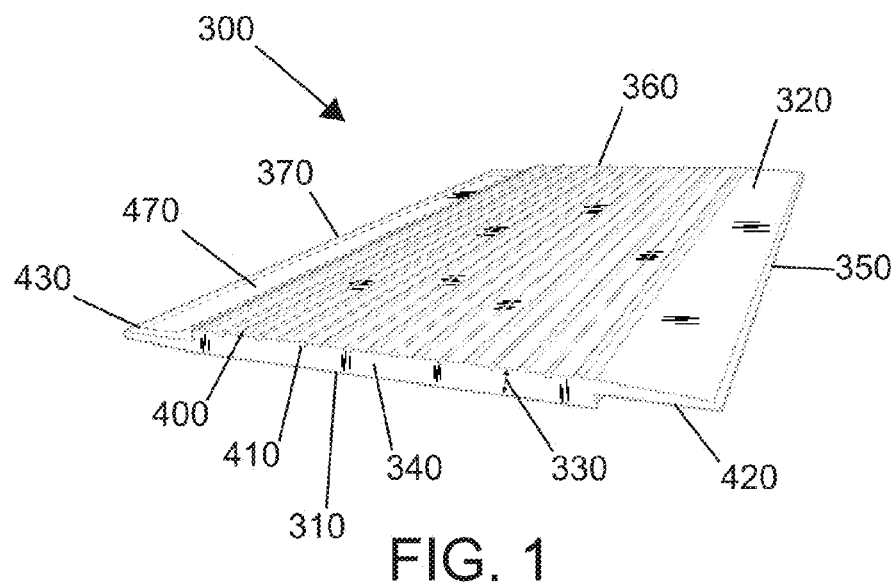
FIG. 1 is a perspective view of the gripping wrap of the present invention.
Figure 2:
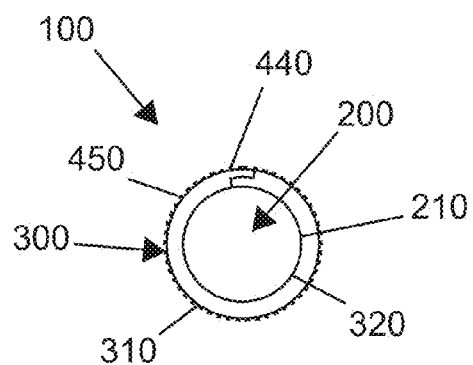
FIG. 2 is a cross-sectional view in a transverse plane of the present invention.
Figure 3:
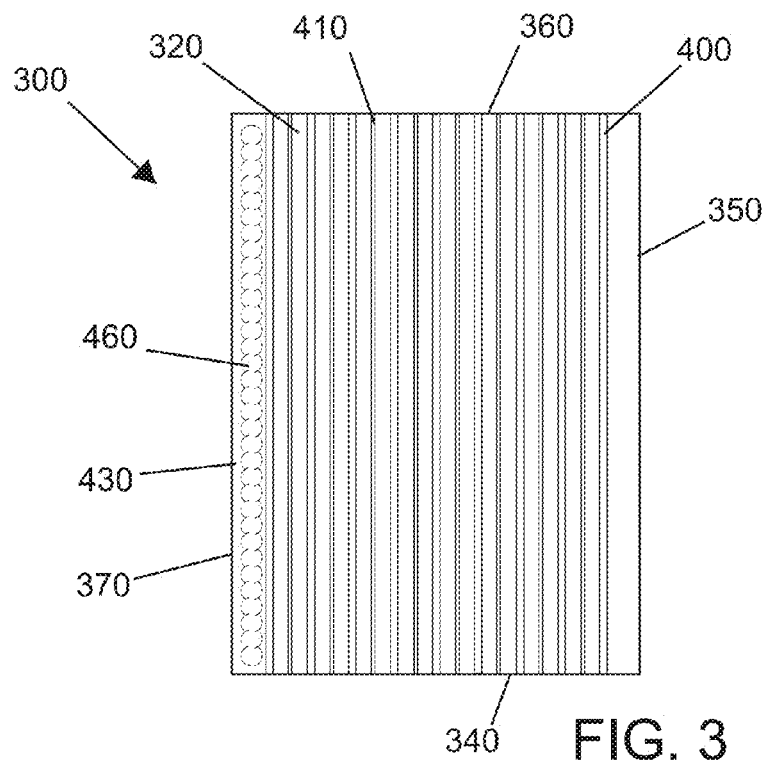
FIG. 3 is a bottom view of the gripping wrap of the present invention.
Figure 4:
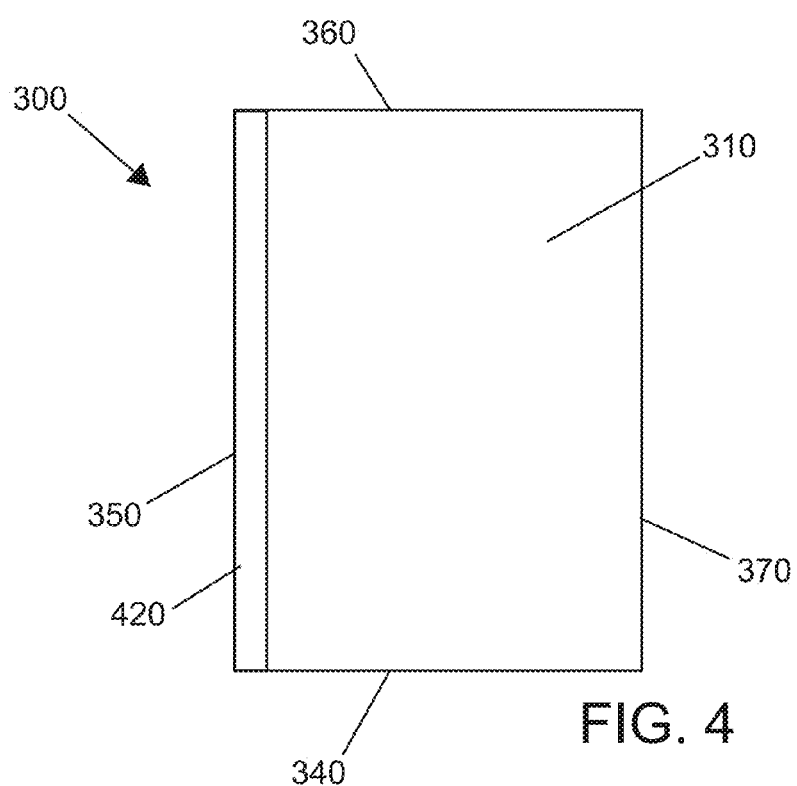
FIG. 4 is a top view of the gripping wrap of the present invention.
Figure 5:
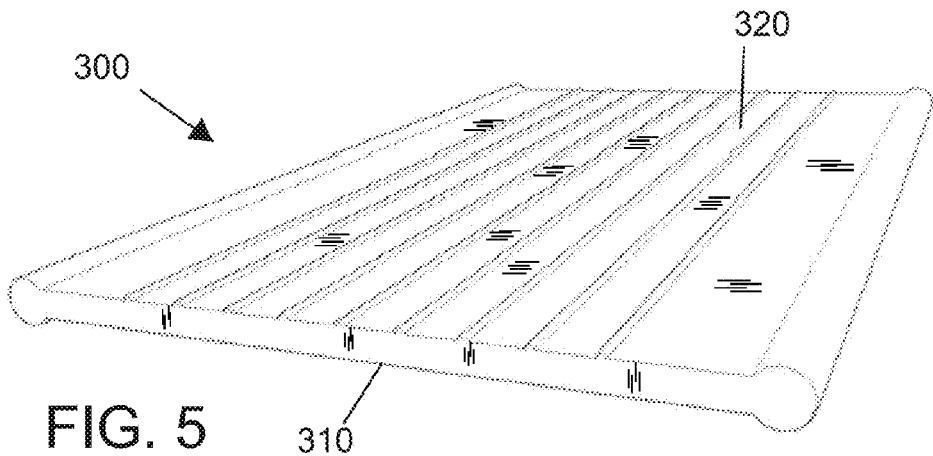
FIG. 5 is a perspective view of an alternate embodiment of the gripping wrap of the present invention.
Figure 6:
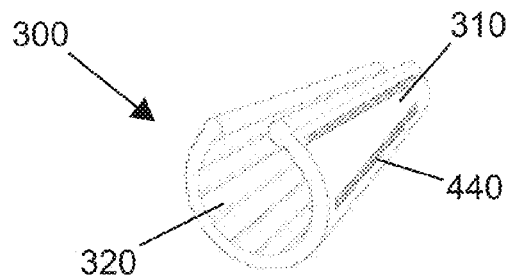
FIG. 6 is a perspective view of an alternate embodiment of the gripping wrap of the present invention.
Figure 7:
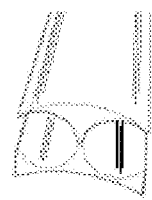
FIG. 7 is perspective view of an alternate embodiment of the locking bar of the present invention.
Figure 8:
FIG. 8 is a cross-sectional view in a transverse plane of alternate embodiments of the locking bar of the present invention.

Referring now to FIG. 1-21, the present invention features a gripping system (100) for a handle (200). In some embodiments, the system (100) comprises a cylindrical handle (200) having a handle exterior surface (210).

In some embodiments, the system (100) comprises a flexible gripping wrap (300) having a wrap top surface (310), a wrap bottom surface (320), a wrap thickness (330) from the wrap top surface (310) to the wrap bottom surface (320), a wrap first edge (340), a wrap second edge (350), a wrap third edge (360) opposed to the wrap first edge (340), and a wrap fourth edge (370) opposed to the wrap second edge (350). In some embodiments, the gripping wrap (300) comprises a plurality of outwardly protruding ridges (400) located on the wrap bottom surface (320) from the wrap first edge (340) to the wrap third edge (360). In some embodiments, the gripping wrap (300) comprises a plurality of inwardly protruding channels (410) located on the wrap bottom surface (320) from the wrap first edge (340) to the wrap third edge (360).

In some embodiments, the gripping wrap (300) comprises a first recessed ledge (420) located on an intersection of the wrap top surface (310) and the wrap second edge (350). In some embodiments, the gripping wrap (300) comprises a second recessed ledge (430) located at an intersection of the wrap bottom surface (320) and the wrap fourth edge (370). In some embodiments, the gripping wrap (300) is located on and flexibly covers at least a portion of the handle exterior surface (210). In some embodiments, the second recessed ledge (430) is adapted to overlay and interfaceably attach to the first recessed ledge (420). In some embodiments, the gripping system (100) for the handle (200) is adapted to provide gripping stability and comfort for a user.

In some embodiments, the gripping wrap (300) comprises a first projection (480) located on an intersection of the wrap top surface (310) and the wrap second edge (350). In some embodiments, the gripping wrap (300) comprises a second projection (490) located at an intersection of the wrap bottom surface (320) and the wrap fourth edge (370). In some embodiments, the gripping wrap (300) is located on and flexibly covers at least a portion of the handle exterior surface (210). In some embodiments, the wrap bottom surface (320) having the first projection (480) is adapted to wrap around at least a portion of and contact the handle exterior surface (210). In some embodiments, the second projection (490) is adapted to slidably insert underneath the first projection (480) against the handle (200) sliding past a first projection ledge (482) and be held into place via tension interlocking a second projection ledge (492) against the first projection ledge (482). In some embodiments, a cross-section of the first projection (480) and the second projection (490) comprises a first planar side, a second planar side, and a third radial side. In some embodiments, the first planar side is the first projection ledge (482) or the second projection ledge (492).

In some embodiments, the gripping wrap (300) comprises a plurality of cylindrical pockets (510) located on the wrap second edge (350) and a plurality of cylindrical pockets (510) located on the wrap fourth edge (370). In some embodiments, a first aperture is centrally located on a flat cylindrical pocket first end and a second aperture is centrally located on a flat pocket second end. In some embodiments, the first aperture is fluidly connected to the second aperture through the cross section of the cylindrical pocket (510). In some embodiments the plurality of cylindrical pockets (510) located on the wrap second edge (350) and the plurality of cylindrical pockets (510) located on the wrap fourth edge (370) are offset from one another, so that when the gripping wrap (300) is rolled into a cylindrical shape (around the handle (200)), the plurality of cylindrical pockets (510) on the wrap second edge (350) align with the cylindrical pockets (510) on the wrap fourth edge (370) so that a locking rod (500) may slidably pass through the first aperture and second aperture of each sequential cylindrical pocket (510). In some embodiments, the gripping wrap (300) is located on and flexibly covers at least a portion of the handle exterior surface (210). In some embodiments, the wrap bottom surface (320) is adapted to wrap around at least a portion of and contact the handle exterior surface (210).

In some embodiments, the locking rod (500) is cylindrical and elongated.

In some embodiments, the gripping wrap (300) is rectangular.

In some embodiments, the gripping wrap (300) is constructed from a rubber. In some embodiments, the gripping wrap (300) is constructed from a silicone rubber. In some embodiments, the gripping wrap (300) is constructed from a plastic. In some embodiments, the gripping wrap (300) is constructed from an elastomeric material. In some embodiments, the gripping wrap (300) is constructed from a foam.

In some embodiments, the wrap top surface (310) comprises a gripping aid (440). In some embodiments, the gripping aid (440) comprises ridges (400). In some embodiments, the gripping aid (440) comprises a textured surface (450).

In some embodiments, the wrap bottom surface (320) comprises an adhesive component (460) located thereon. In some embodiments, the first recessed ledge (420) comprises an adhesive component (460) located thereon. In some embodiments, the second recessed ledge (430) comprises an adhesive component (460) located thereon.

In some embodiments, the first recessed ledge (420) comprises a magnetic component (470) located thereon. In some embodiments, the second recessed ledge (430) comprises a magnetic component (470) located thereon.

Alternate Embodiment of the System Featuring a Locking Bar.

In some embodiments, the system has a gripping wrap (or a sheet) with a wrap top surface (or a sheet top surface), a wrap bottom surface (or a sheet bottom surface) with a friction enhancing interface, a wrap first edge, a wrap second edge with a second edge connecting member, a wrap third edge, and a wrap fourth edge with a fourth edge connecting member. In some embodiments, the system further has a locking bar with a locking bar first side and a locking bar second side.

In some embodiments, the gripping wrap is wrapped around a handle, where the locking bar first side slides into or onto the second edge connecting member, and the locking bar second side slides into or onto the fourth edge connecting member. The gripping wrap is held into place around the handle via the locking bar.

In some embodiments, the gripping wrap is generally rectangular. In some embodiments, the gripping wrap can be trimmed to fit. In some embodiments, the gripping wrap is polygonal, for example, hexagonal.

In some embodiments, the gripping wrap has a thickness from 0" to ¼". In some embodiments, the gripping wrap has a thickness from ¼" to ½".

In some embodiments, the gripping wrap is constructed from a rubber or silicone rubber. In some embodiments, the gripping wrap is constructed from a plastic. In some embodiments, the gripping wrap is constructed from a spongy material. In some embodiments, the gripping wrap is constructed from a pliable material. In some embodiments, the gripping wrap is constructed from an elastic material.

In some embodiments, the gripping wrap can be shrunk upon application of a heat source.

In some embodiments, the wrap top surface has a gripping aid. In some embodiments, the wrap bottom surface has a gripping aid. In some embodiments, the gripping aid has ridges. In some embodiments, the gripping aid has channels. In some embodiments, the gripping aid has a textured surface.

In some embodiments, the gripping aid has an embossed surface. In some embodiments, the gripping aid has a raised surface. In some embodiments, the gripping aid interfaces with the hand of the user.

In some embodiments, the wrap bottom surface has an adhesive component.

In some embodiments, the friction enhancing interface has one or more ridges. In some embodiments, the friction enhancing interface has one or more grooves.

In some embodiments, the second edge connecting member has a generally round cross-section. In some embodiments, the second edge connecting member has a generally polygonal cross-section. In some embodiments, the second edge connecting member has a generally arrow-shaped cross-section. In some embodiments, the second edge connecting member has a generally one-haft arrow-shaped cross section.

In some embodiments, the second edge connecting member has a generally flat mating surface. In some embodiments, the second edge connecting member has an adhesive component. In some embodiments, the second edge connecting member has a magnetic component.

In some embodiments, the fourth edge connecting member has a generally round cross-section. In some embodiments, the fourth edge connecting member has a generally polygonal cross-section. In some embodiments, the fourth edge connecting member has a generally arrow-shaped cross-section. In some embodiments, the fourth edge connecting member has a generally one-half arrow-shaped cross section.

In some embodiments, the fourth edge connecting member has a generally flat mating surface. In some embodiments, the fourth edge connecting member has an adhesive component. In some embodiments, the fourth edge connecting member has a magnetic component.

In some embodiments, the locking bar is constructed from a rubber. In some embodiments, the locking bar is constructed from a plastic. In some embodiments, the locking bar is constructed from a metal.

In some embodiments, the locking bar first side has a first side complementary receiving member to receive the second edge connecting member. In sonic embodiments, the first side complementary receiving member has a hollow channel that slidably attaches to the second edge connecting member. In some embodiments, the hollow channel mates to the second edge connecting member.

In some embodiments, the locking bar second side has a second side complementary receiving member to receive the fourth edge connecting member. In some embodiments, the second side complementary receiving member has a hollow channel that slidably attaches to the fourth edge connecting member. In sonic embodiments, the hollow channel mates to fourth edge connecting member.

In some embodiments, the length of the wrap second edge is between 0" and 6". In some embodiments, the length of the wrap second edge is between 6" and 12". In some embodiments, the length of the wrap second edge is between 12" and 24". In some embodiments, the length of the wrap second edge is greater than 24".

In some embodiments, the length of the wrap fourth edge is between 0" and 6". In some embodiments, the length of the wrap fourth edge is between 6" and 12". In some embodiments, the length of the wrap fourth edge is between 12" and 24". In some embodiments, the length of the wrap fourth edge is greater than 24".

In some embodiments, the width of the gripping wrap measured from the wrap second edge to the wrap fourth edge is between 0" and 6". In some embodiments, the width of the gripping wrap measured from the wrap second edge to the wrap fourth edge is between 6" and 12". In some embodiments, the width of the gripping wrap measured from the wrap second edge to the wrap fourth edge is between 12" and 24". In some embodiments, the width of the gripping wrap measured from the wrap second edge to the wrap fourth edge is greater than 24".

As used herein, the term "about" refers to plus or minus 10% of the referenced number. For example, an embodiment wherein the handle is about 10 inches in length includes a handle that is between 9 and 11 inches in length.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A gripping system (100) for a handle (200), wherein said system (100) comprises:
   (a) a cylindrical handle (200) having a handle exterior surface (210); and
   (b) an elongated elastomeric flexible gripping wrap (300) having a planar wrap top surface (310), a planar wrap bottom surface (320), a wrap thickness (330) from the wrap top surface (310) to the wrap bottom surface (320), a wrap first edge (340), a wrap second edge (350), a wrap third edge (360) opposed to the wrap first edge (340), and a wrap fourth edge (370) opposed to the wrap second edge (350), wherein the gripping wrap (300) comprises a plurality of outwardly protruding ridges arranged in rows (400) longitudinally disposed on the wrap bottom surface (320) from the wrap first edge (340) to the wrap third edge (360), and the height of each of said ridges protruding outwardly from the plane of said wrap bottom surface, wherein the gripping wrap (300) comprises a plurality of inwardly protruding channels (410) longitudinally disposed on the wrap bottom surface (320) from the wrap first edge (340) to the wrap third edge (360), and the depth of each of said channels protruding inwardly from the plane of said wrap bottom surface, wherein the gripping wrap (300) comprises a first recessed ledge (420) disposed on an intersection of the wrap top surface (310) and the wrap second edge (350), wherein the gripping wrap (300) comprises a second recessed ledge (430) disposed at an intersection of the wrap bottom surface (320) and the wrap fourth edge (370), wherein the gripping wrap (300) is disposed on and flexibly covers at least a portion of the handle exterior surface (210), wherein the second recessed ledge (430) is adapted to overlay and interfaceably attach to the first recessed ledge (420), wherein the gripping system (100) for the handle (200) is adapted to provide gripping stability and comfort for a user.

2. The system (100) of claim 1, wherein the gripping wrap (300) is rectangular.

3. The system (100) of claim 1, wherein the gripping wrap (300) is constructed from a rubber.

4. The system (100) of claim 1, wherein the gripping wrap (300) is constructed from a silicone rubber.

5. The system (100) of claim 1, wherein the gripping wrap (300) is constructed from a plastic.

6. The system (100) of claim 1, wherein the gripping wrap (300) is constructed from a foam.

7. The system (100) of claim 1, wherein the wrap top surface (310) comprises a gripping aid (440).

8. The system (100) of claim 7, wherein the gripping aid (440) comprises ridges (400).

9. The system (100) of claim 7, wherein the gripping aid (440) comprises a textured surface (450).

10. The system (100) of claim 1, wherein the wrap bottom surface (320) comprises an adhesive component (460) disposed thereon.

11. The system (100) of claim 1, wherein the first recessed ledge (420) comprises an adhesive component (460) disposed thereon.

12. The system (100) of claim 1, wherein the second recessed ledge (430) comprises an adhesive component (460) disposed thereon.

13. The system (100) of claim 1, wherein the first recessed ledge (420) comprises a magnetic component (470) disposed thereon.

14. The system (100) of claim 1, wherein the second recessed ledge (430) comprises a magnetic component (470) disposed thereon.

15. A gripping system (100) for a handle (200), wherein said system (100) consists of:
   (a) a cylindrical handle (200) having a handle exterior surface (210); and
   (b) an elongated elastomeric flexible gripping wrap (300) having a planar wrap top surface (310), a planar wrap bottom surface (320), a wrap thickness (330) from the wrap top surface (310) to the wrap bottom surface (320), a wrap first edge (340), a wrap second edge (350), a wrap third edge (360) opposed to the wrap first edge (340), and a wrap fourth edge (370) opposed to the wrap second edge (350), wherein the gripping wrap (300) consists of a plurality of outwardly protruding ridges arranged in rows (400) longitudinally disposed on the wrap bottom surface (320) from the wrap first edge (340) to the wrap third edge (360), and the height of each of said ridges protruding outwardly from the plane of said wrap bottom surface, and wherein the gripping wrap (300) consists of a plurality of inwardly protruding channels (410) longitudinally disposed on the wrap bottom surface (320) from the wrap first edge (340) to the wrap third edge (360), and the depth of each of said channels protruding inwardly from the plane of said wrap bottom surface, wherein the gripping wrap (300) consists of a first recessed ledge (420) disposed on an intersection of the wrap top surface (310) and the wrap second edge (350), wherein the gripping wrap (300) consists of a second recessed ledge (430) disposed at an intersection of the wrap bottom surface (320) and the wrap fourth edge (370), wherein the gripping wrap (300) is disposed on and flexibly covers at least a portion of the handle exterior surface (210), wherein the second recessed ledge (430) is adapted to overlay and interfaceably attach to the first recessed ledge (420), wherein the gripping system (100) for the handle (200) is adapted to provide gripping stability and comfort for a user.

16. A gripping system (100) for a handle (200), wherein said system (100) comprises:
   (a) a cylindrical handle (200) having a handle exterior surface (210); and
   (b) an elongated elastomeric flexible gripping wrap (300) having a planar wrap top surface (310), a planar wrap bottom surface (320), a wrap thickness (330) from the wrap top surface (310) to the wrap bottom surface (320), a wrap first edge (340), a wrap second edge (350), a wrap third edge (360) opposed to the wrap first edge (340), and a wrap fourth edge (370) opposed to the wrap second edge (350), wherein the gripping wrap (300) comprises a plurality of outwardly protruding ridges arranged in rows (400) longitudinally disposed on the wrap bottom surface (320) from the wrap first edge (340) to the wrap third edge (360), and the height of each of said ridges protruding outwardly from the plane of said wrap bottom surface, wherein the gripping wrap (300) comprises a plurality of inwardly protruding channels (410) longitudinally disposed on the wrap bottom surface (320) from the wrap first edge (340) to the wrap third edge (360), and the depth of each of said channels protruding inwardly from the plane of said wrap bottom surface, wherein the gripping wrap (300) comprises a first raised ledge (482) disposed on an intersection of the wrap top surface (310) and the wrap second edge (350), wherein the gripping wrap (300) comprises a second raised ledge (492) disposed at an intersection of the wrap bottom surface (320) and the wrap fourth edge (370), wherein the gripping wrap (300) is disposed on and flexibly covers at least a portion of the handle exterior surface (210), wherein the second raised ledge (492) is adapted to overlay and interfaceably attach to the first raised ledge (482), wherein the gripping system (100) for the handle (200) is adapted to provide gripping stability and comfort for a user.

* * * * *